(12) United States Patent
Castiglione

(10) Patent No.: US 6,705,317 B2
(45) Date of Patent: Mar. 16, 2004

(54) RETENTION ASSEMBLY WITH COMPRESSION ELEMENT AND METHOD OF USE

(75) Inventor: David M. Castiglione, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 185 days.

(21) Appl. No.: 09/929,764

(22) Filed: Aug. 14, 2001

(65) Prior Publication Data

US 2002/0026943 A1 Mar. 7, 2002

Related U.S. Application Data

(62) Division of application No. 09/426,808, filed on Oct. 22, 1999.

(51) Int. Cl.[7] ................................................ A62B 18/08
(52) U.S. Cl. ........................... 128/207.11; 128/205.25; 128/206.27; 604/179; 604/180
(58) Field of Search ................... 604/178, 179, 604/180; 428/161, 162, 163, 167; 228/49.5, 110.1, 292, 212, 213; 156/73.1; 128/205.25, 206.27

(56) References Cited

U.S. PATENT DOCUMENTS

| | | |
|---|---|---|
| 3,722,377 A | 3/1973 | Hayes |
| 3,733,243 A | 5/1973 | Crawford |
| RE28,102 E | 8/1974 | Mayhew |
| 3,971,373 A | 7/1976 | Braun |
| 4,215,682 A | 8/1980 | Kubik et al. |
| 4,323,063 A | 4/1982 | Fisichella |
| 4,410,382 A | 10/1983 | Varela |
| 4,419,993 A | 12/1983 | Petersen |
| 4,536,440 A | 8/1985 | Berg |
| 4,547,420 A | 10/1985 | Krueger et al. |
| 4,665,566 A | 5/1987 | Garrow |
| 4,729,371 A | 3/1988 | Krueger et al. |
| 4,795,668 A | 1/1989 | Krueger et al. |
| 4,807,619 A | 2/1989 | Dyrud et al. |
| 4,827,924 A | 5/1989 | Japuntich |
| 4,838,878 A | 6/1989 | Kalt et al. |
| 4,856,509 A | 8/1989 | Lemelson |
| 4,895,456 A | 1/1990 | Morita |
| 4,931,114 A | 6/1990 | Sliva |
| 5,035,034 A | 7/1991 | Cotney |
| 5,062,421 A | 11/1991 | Burns et al. |
| 5,082,111 A | 1/1992 | Corbitt, Jr. et al. |
| 5,269,860 A | 12/1993 | Rice |
| 5,307,796 A | 5/1994 | Kronzer et al. |
| 5,611,478 A | 3/1997 | Asanasavest |
| 5,645,681 A | 7/1997 | Gopalakrishna et al. |
| 5,679,427 A | 10/1997 | Instance |
| 5,707,483 A | 1/1998 | Nayar et al. |
| 5,794,276 A | 8/1998 | Walker |
| 5,908,598 A | 6/1999 | Rousseau et al. |
| 6,041,782 A | 3/2000 | Angadjivand et al. |
| 6,116,236 A | 9/2000 | Wyss |
| 6,148,817 A | 11/2000 | Bryant et al. |
| 6,332,465 B1 | 12/2001 | Xue et al. |

FOREIGN PATENT DOCUMENTS

| | | |
|---|---|---|
| BE | 862767 | 5/1978 |
| DE | 4428938 | 8/1994 |
| EP | 0850607 A1 | 7/1998 |
| GB | 574 288 | 12/1945 |

Primary Examiner—Weilun Lo
Assistant Examiner—Michael G Mendoza
(74) Attorney, Agent, or Firm—Karl G. Hanson; Kevin W. Raasch

(57) ABSTRACT

A compression element and a retention assembly using the compression element to retain an article on a flexible substrate are disclosed. Also disclosed is a method of making an assembly including an article retained on a substrate by a compression element. The retention assembly, compression element and method provide replacements for, e.g., mechanical staples. The retention assemblies, compression elements and methods are particularly useful for attaching elastic articles to the surfaces of flexible substrates without piercing the substrate. One example of attaching an elastic article to the surface of a flexible substrate is the attachment of an elastic strap to a respirator.

20 Claims, 5 Drawing Sheets

RETENTION ASSEMBLY WITH COMPRESSION ELEMENT AND METHOD OF USE

This is a divisional of Application No. 9/426,808 filed Oct. 22, 1999.

The present invention relates to (i) a retention assembly that includes a compression element, a flexible substrate, and an article compressed between the compression element and the flexible substrate; (ii) a compression element that is capable of attaching an article to a flexible substrate, and (iii) a method of making an assembly that includes an article retained on a substrate by a compression element.

BACKGROUND

Devices such as respirators and other articles designed to be worn by a user often rely on elastic straps to secure the devices to the user. In the case of respirators that are designed to filter air breathed by a user, it is desirable that an airtight, or nearly airtight, seal be obtained between the respirator and the wearer's face. In those devices that use elastic straps, the straps may be provided in the form of braided cotton-elastic bands, rubber bands (for example, natural rubber or polyisoprene), or extruded thermoplastic elastomeric materials (for example, KRATON, available from Shell Oil Company).

Methods of attaching the straps to a respirator vary according to the construction of the straps. For example, braided straps may be stapled to the respirator using conventional metal staples, sewn on the respirator, or inserted into buckles that are located on the respirator. Straps may also be welded directly to the respirator. In this instance, the strap is commonly made of a thermoplastic elastomer. Although stapling and welding are commonplace in the art, both techniques have a variety of drawbacks.

Mechanical stapling of an elastic strap to a respirator or other flexible substrate is a complex operation requiring cutting, forming, driving, and clinching a staple while precisely retaining and locating the strap on the respirator. Mechanical stapling in a continuous motion machine may require that the respirators being stapled be stopped, resulting in reduced throughput. Alternatively, the stapler may match the line speed and move along with the respirator (with zero relative velocity with respect to the respirator). Moving the stapler, however, poses significant problems in equipment design and maintenance due to the mass and size of the stapler. Staples also jam frequently and the jams can be difficult to clear from the machine.

A further drawback of mechanical staples is that different leg lengths are required based on the substrate thickness, with thicker substrates requiring mechanical staples with longer legs and thinner substrates requiring mechanical staples with shorter legs.

Another potential issue with mechanical staples is that the filter media of the respirator is typically punctured by a mechanical staple when that staple is used to attach the strap directly to the respirator dome. The punctures where the staple legs pierce the substrate are potential leak paths which can be a source of concern for some manufacturers and users.

Problems with welding the straps directly to the respirators include a) inconsistent attachment of the straps to the respirator, and b) failure of the bond between the strap and the respirator. In addition, welding the straps directly to the respirator limits the selection of strap materials to thermoplastic elastomers that lack certain properties, e.g., heat resistance, when compared to other materials such as polyisoprene.

SUMMARY OF THE INVENTION

The present invention provides (i) a retention assembly that includes a compression element, a flexible substrate, and an article compressed between the compression element and the substrate; (ii) a compression element that is capable of attaching an article to a flexible substrate; and (iii) a method of making an assembly that includes an article retained on a substrate by a compression element. The retention assembly, compression element and method of the present invention provide replacements for, e.g., mechanical staples. The retention assemblies, compression elements and methods are particularly useful for attaching elastic articles to the surfaces of flexible substrates without piercing the substrate. One example of attaching an elastic article to the surface of a flexible substrate is the attachment of an elastic strap to a respirator.

The compression element of the present invention can securely retain an article on the surface of a flexible substrate. It is theorized that the flexible substrate is held taut behind the compression element during and after attachment of the compression element to the substrate. The article is compressed between the compression element and the taut flexible substrate. It should be noted, however, that the present invention is not to be limited by theory, which is offered only to potentially improve understanding of the invention.

In one aspect, the present invention provides a retention assembly that includes a flexible substrate with first and second major surfaces and a compression element located on the first major surface of the substrate. The compression element includes a clamping area on a front face of the compression element and first and second bonding areas on the front face of the compression element. The bonding areas are located on opposite sides of the clamping area and are bonded to the first major surface of the substrate. The assembly further includes at least one article located between the first major surface of the substrate and the clamping area of the compression element, wherein the articles are compressed between the flexible substrate and the clamping area.

In a second aspect, the present invention provides a compression element that includes a body with a front face, a back face, and a clamping area on the front face of the body. The compression element also includes first and second bonding areas located on opposite sides of the clamping area on the front face of the compression element, and each of the bonding areas includes at least one energy director. The compression element further includes first and second channels in the front face of the element body, with the first channel located between the first bonding area and the clamping area and the second channel located between the second bonding area and the clamping area.

In a third aspect, the present invention provides a method of making an assembly that includes an article retained on a flexible substrate. The method includes providing a compression element that has a body including a front face and a back face. The compression element also includes a clamping area on the front face of the body and first and second bonding areas on the front face of the body. The first and second bonding areas are located on first and second sides of the clamping area. The method further includes locating the article on a surface of the flexible substrate, followed by locating the clamping area of the compression element on the article with the first and second bonding areas located on opposite sides of the article. The article is then compressed between the clamping area of the compression element and the flexible substrate while the bonding areas are attached to the flexible substrate. As a result, the compression element is attached to the flexible substrate at the first and second bonding areas and the article is retained between the clamping area and the flexible substrate.

These and other features and advantages of the present invention are described more completely below with respect to various illustrative embodiments of the invention and methods of the invention.

GLOSSARY

In reference to the invention, the following terms are defined as set forth below:

"adhesively attach" means to attach two articles by the use of an adhesive;

"bond" and its variations mean attach by any suitable technique including, but not limited to, welding (ultrasonically, chemically, etc.), adhesive attachment, and mechanical interlocking;

"bonding area" means an area on a compression element that is capable of bonding to a flexible substrate;

"clamping area" means an area on a compression element that is capable of clamping an article against a flexible substrate;

"compress" and its variations mean to deform an article by compression from its uncompressed state or shape;

"compression element" means an article that is bonded to a flexible substrate on either side of an article and includes at least two bonding areas and at least one clamping area;

"elastic" means a material that is capable of being stretched at least 1.2 times in length in at least one dimension and then is able to substantially recover its original size and shape within one minute after removing the deforming stress;

"flexible substrate" means a substrate that is not as stiff or rigid as the compression element attached to the substrate (for example, the tension induced in the substrate during attachment of the compression element as described below can be retained after the compressive force is removed);

"polymer" includes homopolymers, copolymers or polymer blends;

"polymeric" means including at least one polymer and possibly other ingredients in addition to polymers;

"respirator" means a system or device worn over a person's breathing passages to prevent contaminants from entering the wearer's respiratory tract and/or protect other persons or things from exposure to pathogens or other contaminants expelled by the wearer during respiration, including, but not limited to filtering face masks;

"textured surface" means a surface that is not smooth, e.g., a surface that includes some structure (such as ridges, fish-scale patterns, etc.); a finish (such as a knurl pattern, etc.); or additional components secured on the surface (e.g., particulates, etc.); and "weld" means to attach two articles by melting or fusing.

DETAILED DESCRIPTION OF ILLUSTRATIVE EMBODIMENTS OF THE INVENTION

The compression element and method of the present invention can be used to securely attach an article on the surface of a flexible substrate by compressing the article between the compression element and the substrate surface while the compression element is attached to the flexible substrate surface. Although not wishing to be bound by theory, it is theorized that compression of the article causes the flexible substrate to become taut or placed under tension beneath the compression element. That tautness or tension in the flexible substrate is retained after attachment of the compression element is completed and after the external force used to compress the article between the compression element and the flexible substrate is removed.

Although the present invention is described below with respect to the attachment of elastic straps to respirators, the compression elements and methods of the invention are also applicable in a variety of situations in which an article must be secured against the surface of a flexible substrate. The articles secured to the substrate may be elastic, non-elastic, or may include both elastic and non-elastic components. The substrates may include one or more layers of fibrous polymeric materials that may be woven or nonwoven. Also, the fibrous polymeric materials may be porous or non-porous. Examples of some such articles include, but are not limited to, respirators, masks, garments (e.g., surgical gowns), surgical and other drapes, etc.

Figure 1:
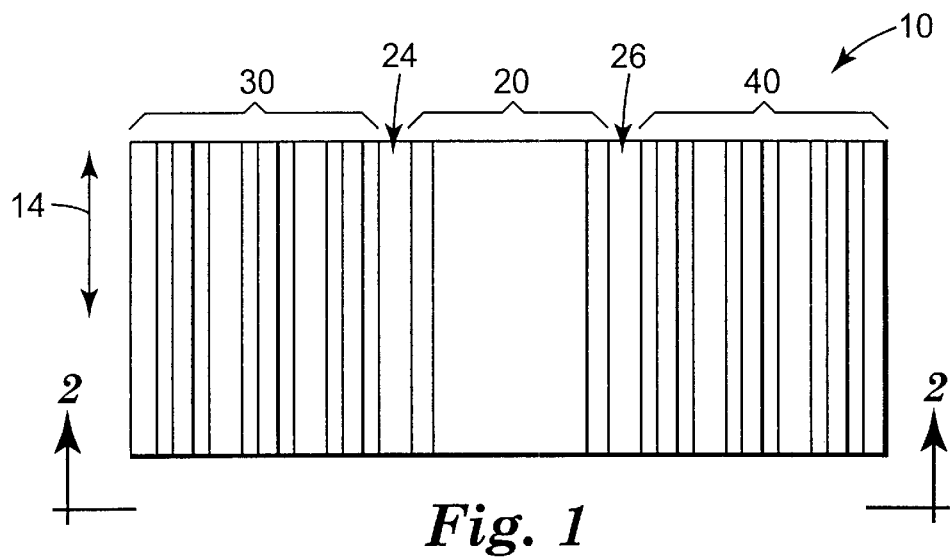
FIG. 1 is a top plan view of the front face of a compression element 10 according to the present invention.
Figure 2:
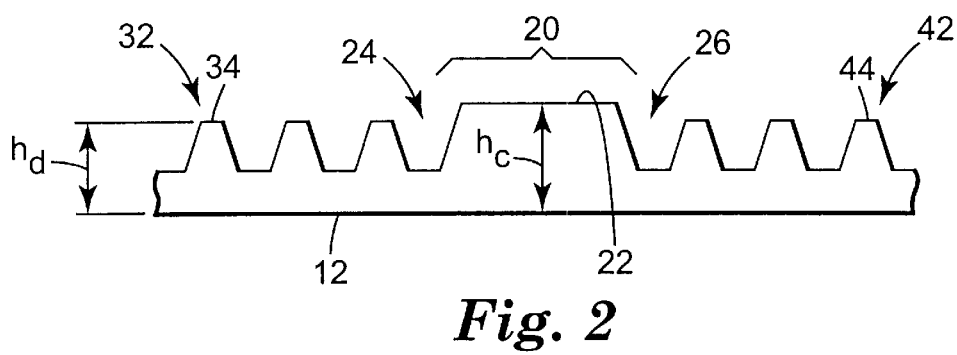
FIG. 2 is a view of the compression element 10 of FIG. 1 taken along line 2—2 in FIG. 1.

FIG. 1 is a top plan view of one illustrative embodiment of a compression element 10 of the invention. FIG. 2 is a side view of element 10 taken along 2—2 in FIG. 1. The element 10 includes a clamping area 20 that is located between a first bonding area 30 and a second bonding area 40. The clamping area 20, as well as the first and second bonding areas 30 and 40, are located on a front face of the element 10. The back face 12 of the element 10 may be relatively smooth, although that is not a requirement of compression elements according to the present invention.

The compression element 10 of FIG. 1 is designed to be ultrasonically welded to a flexible substrate. As a result, each of the first and second bonding areas 30 and 40 includes at least one, more preferably a plurality, of welding energy directors 32 and 42, respectively. Each of the energy directors 32 and 42 includes a peak 34 and 44, respectively, that is preferably narrower than the base of the energy director. The clamping area 20 is preferably separated from each of the first and second bonding areas 30 and 40 by a channel 24 and 26, respectively.

In the illustrated compression element 10, each of the energy directors 32 and 42 in the first and second bonding areas 30 and 40 are preferably generally aligned with axis 14 (see FIG. 1). As a result, none of the energy directors 32 and 42 are aligned such that their elongation axes intersect the clamping area 20. This may be important in some situations where it is desirable to prevent transmission of the welding energy to the clamping area 20, which could result in transmission of that energy into the strap that is being secured on the flexible substrate. The energy can then damage the strap, which may result in its premature failure.

FIG. 2 illustrates another optional feature of the present invention in which the element 10 has a clamping area height, $h_c$, which is the height of the upper surface 22 of the clamping area 20 from the back face 12 of the element 10. Also illustrated in FIG. 2 is the energy director height, $h_d$, which is the height of the peak 34 of energy director 32 above the back face 12 of the element 10. In some embodiments, it may be desirable that $h_c$ be greater than $h_d$ to further assist in clamping the elastic article between element 10 and a flexible substrate. In other situations, the clamping area height $h_c$, may be equal to or less than the energy director height $h_d$. The relative heights of the different portions of element 10 will typically be determined based on empirical testing with the desired materials.

The surface 22 of the clamping area 20 may be generally smooth or, in other alternatives, the surface 22 may be textured by embossing or structuring to improve its ability to retain an elastic article between element 10 and a flexible substrate against pull-out. In another alternative, the surface 22 may be coated with an adhesive or other material to improve the retention properties of the surface 22.

Figure 3:
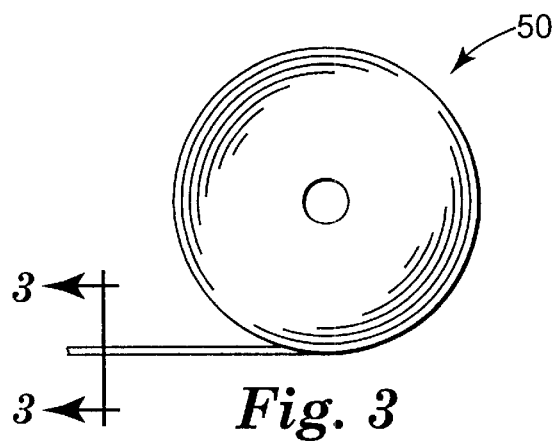
FIG. 3 is a side elevational view of a roll 50 of compression elements 10 for use in a method according to the present invention.

FIG. 3 illustrates a roll 50 of compression elements 10 that may be used in the method of the invention. The roll 50 may preferably be formed by extrusion with individual compression elements 10 being cut or otherwise separated from the roll 50 on an as-needed basis. It may be particularly advantageous to provide compression elements 10 in roll form where elongated energy directors are aligned as illustrated in FIGS. 1 and 2. Elements 10 could be extruded in the direction of axis 14 (see FIG. 1). The resulting extrusion would have a profile as seen in FIG. 2 when viewed along line 3—3 in FIG. 3.

Providing the compression elements 10 in roll form may facilitate their use in high speed and/or continuous manufacturing processes where individual elements 10 could be cut or otherwise separated from the roll 50 in any desired length and secured to a substrate as needed. Some illustrative manufacturing processes are described below.

The materials used to manufacture the weldable compression elements of the present invention are preferably compatible with the welding process to be used to attach the element to a given substrate. As a result, particular materials used in the elements will be selected based on the materials that are themselves amenable to welding by the desired form of welding energy, as well as the materials used in the substrate to which the element is to be welded. In the case of, for example, respirators manufactured using meltblown polymeric microfibers, the compression elements may preferably be formed of polypropylene, although many other materials are potentially useful in the compression elements of the present invention.

Figure 4:
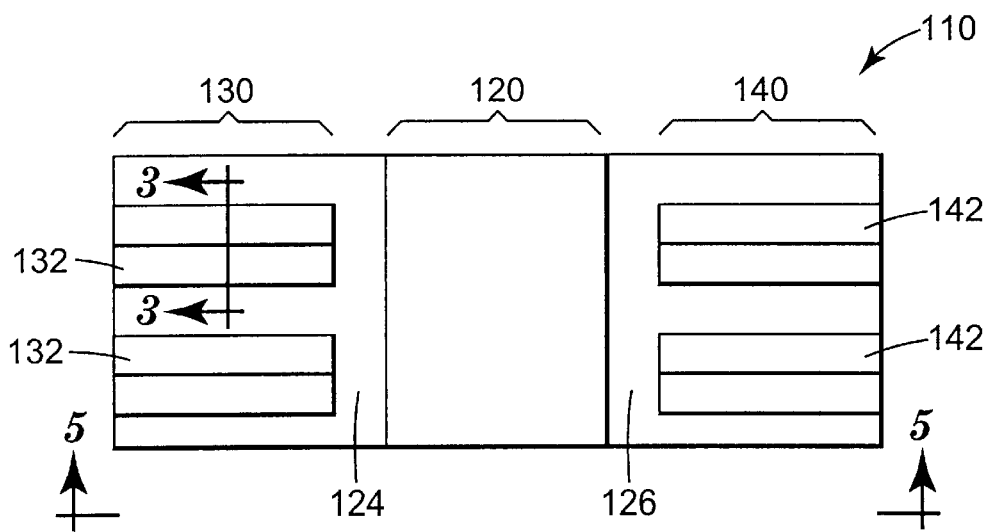
FIG. 4 is a top plan view of the front face of an alternative compression element 110 according to the present invention.
Figure 5:
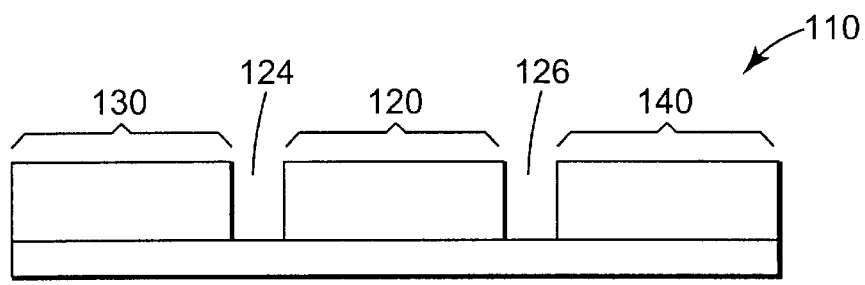
FIG. 5 is a side elevational view of the element 110 of FIG. 4 taken along line 5—5 in FIG. 4.

FIGS. 4 and 5 illustrate one alternative compression element 110 according to the present invention. The compression element 110 includes a clamping area 120 and first and second bonding areas 130 and 140 located on opposite sides of the clamping area 120. The clamping area 120 is separated from the bonding areas 130 and 140 by channels 124 and 126, respectively. The channels 124 and 126 may be particularly helpful in element 110 because the energy directors 132 and 142 are aligned such that, unless separated from clamping area 120, they would intersect the clamp area 120. That alignment could result in the undesired transfer of welding energy into the clamping area of the element 110. That undesired transfer of welding energy can notch the article being secured to the flexible substrate. In some applications, however, it may be desirable that the welding energy be at least partially directed into the clamping area 120, in which case channels 124 and 126 could be eliminated.

Figure 6:
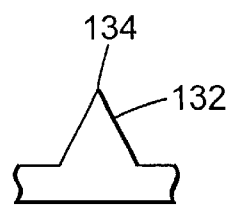
FIG. 6 is an enlarged partial cross-sectional view of a portion of the element 110 of FIG. 4 taken along line 6—6 in FIG. 4.

A further variation in the element 110 from the element 10 of FIGS. 1 and 2 is the profile or shape of the energy directors. FIG. 6 illustrates an enlarged view of one such energy director 132 in which the peak 134 of the energy director 132 terminates in a relatively sharp edge as opposed to the flattened or rounded energy directors 32 and 42 illustrated in connection with element 10 in FIGS. 1 and 2. The particular profile of the energy directors used in the compression elements of the present invention will, however, typically be selected based on the particular materials being used and other process considerations. For example, respirators that include fibrous polymeric filter media may require rounded or flattened energy directors to reduce the likelihood of the element cutting through the media.

Alignment of elongated energy directors in the compression elements of the present invention may be important depending on the materials that are used for the element itself, the substrate materials and/or the elastic article materials. For example, with respect to natural rubber or polyisoprene straps for respirators, notching of the strap (caused, for example, by the undesired transfer of welding energy into the clamping area of the compression element as described above) can be a significant cause of premature breakage when the strap is stretched during use of the respirator. As a result, the compression element should be designed to limit or prevent welding energy transmission into the elastic strap to prevent the undesired transfer of welding energy into the clamping area. In other situations, it may be desirable to allow for at least some welding energy transmission into the clamping area depending on the materials used in the element, the substrate and the elastic article.

Figure 7:
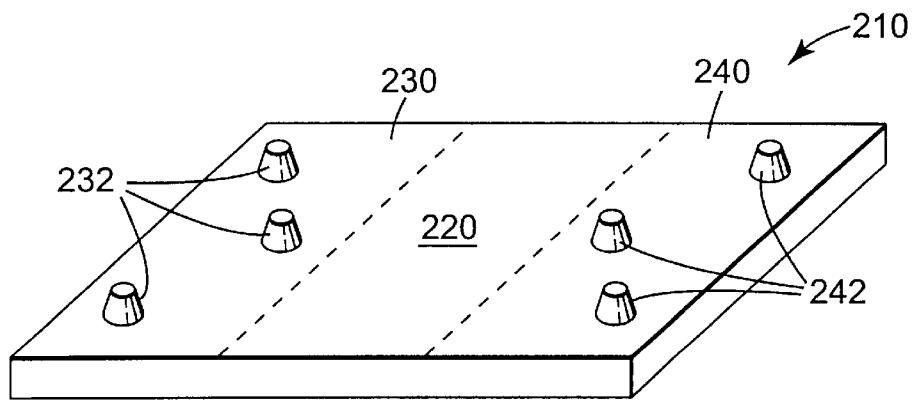
FIG. 7 illustrates an alternative compression element 210 according to the present invention.

FIG. 7 illustrates yet another compression element 210 that includes bonding areas 230 and 240 adapted for welding to a flexible substrate. The bonding areas 230 and 240, however, include energy directors 232 and 242 (respectively) that are not elongated as are the energy directors described above. Because the energy directors 232 and 242 are not elongated, channels separating the clamping area 220 from the bonding areas 230 and 240 are not required to prevent welding energy transmission into the clamping area 220.

Figure 8:
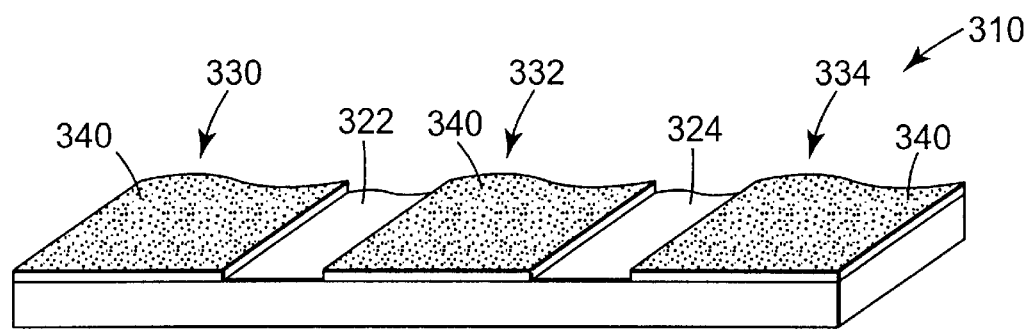
FIG. 8 illustrates another alternative compression element 310 according to the present invention.

FIG. 8 illustrates an alternative compression element 310 that has two clamping areas 322 and 324. Clamping area 322 is located between bonding areas 330 and 332, while clamping area 324 is located between bonding areas 332 and 334. The bonding areas 330, 332 and 334 also exhibit another variation from the embodiments discussed above in that they include an adhesive 340 used to attach each of the bonding areas to a flexible substrate.

In another variation that is not illustrated in the figures, other compression elements may be manufactured according to the present invention in which more than two clamping areas are provided. In each case, however, the clamping areas are preferably bounded on two opposing sides by bonding areas to hold a flexible substrate taut across the clamping areas.

Figure 9:
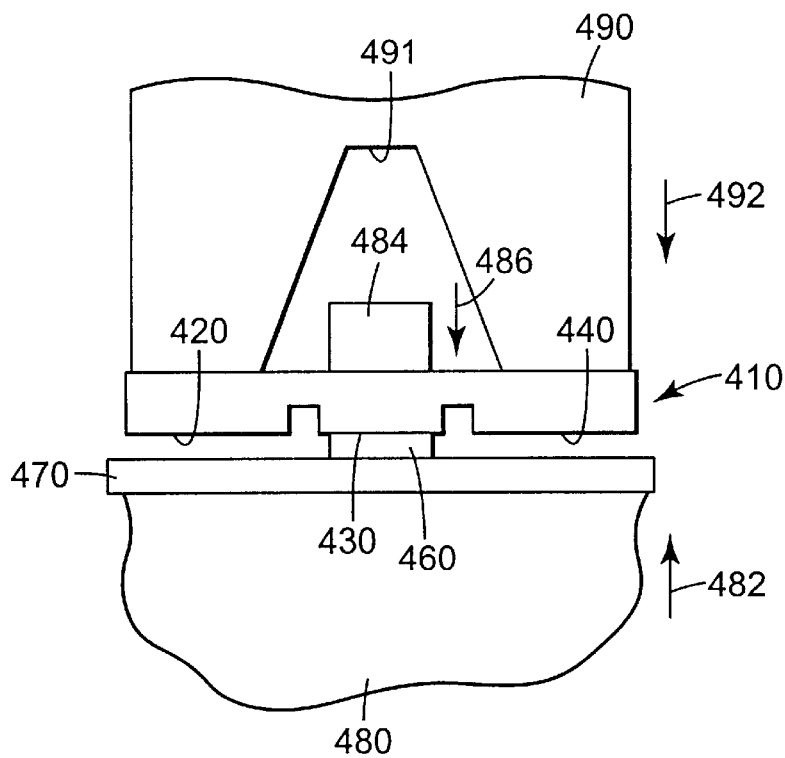
FIG. 9 is an illustration of one method of using a compression element 410 according to the present invention.

FIG. 9 depicts an apparatus for use in one illustrative method of making a retention assembly of the present invention. A compression element 410 is being used retain an article 460 on the substrate 470. The substrate 470 is supported from below by a substrate support 480, which is preferably at least as large as the element 410 that is used to secure article 460. The element 410 is held in place by a central clamp 484 located over the clamping area 420 of the element 410, while the first and second bonding areas 430 and 440 are attached to the substrate 470.

The bonding apparatus 490 is preferably urged in the direction of arrow 492 towards the flexible substrate 470 during attachment of the bonding areas 430 and 440 to the substrate 470. The substrate 470 is supported by substrate support 480, which may also optionally be urged in the direction of arrow 482 to provide additional compressive force during the bonding process. Before the bonding occurs, the central clamp 484 should be urged in the direction of arrow 486 towards flexible substrate 470 such that the article 460 is compressed between the clamping area 420 of element 410 and the flexible substrate 470. As the article 460 is compressed, the substrate 470 is held taut between the bonding areas 430 and 440. After the substrate 470 is taut the bonding areas 430 and 440 can be secured to the substrate 470.

As discussed above, the bonding areas 430 and 440 may be attached to the substrate 470 by welding, adhesives, or any other suitable technique. If welding is to be used, the welding energy may preferably be supplied in the form of ultrasonic energy, and the bonding apparatus 490 may be an ultrasonic welding horn that has a notch 491 formed therein such that ultrasonic energy is not applied to the central clamping area 420 in the element 410. Alternatively, however, it may be possible to use other welding techniques, such as hot stamping, to weld the bonding areas on compression elements to flexible substrates.

Figure 10:
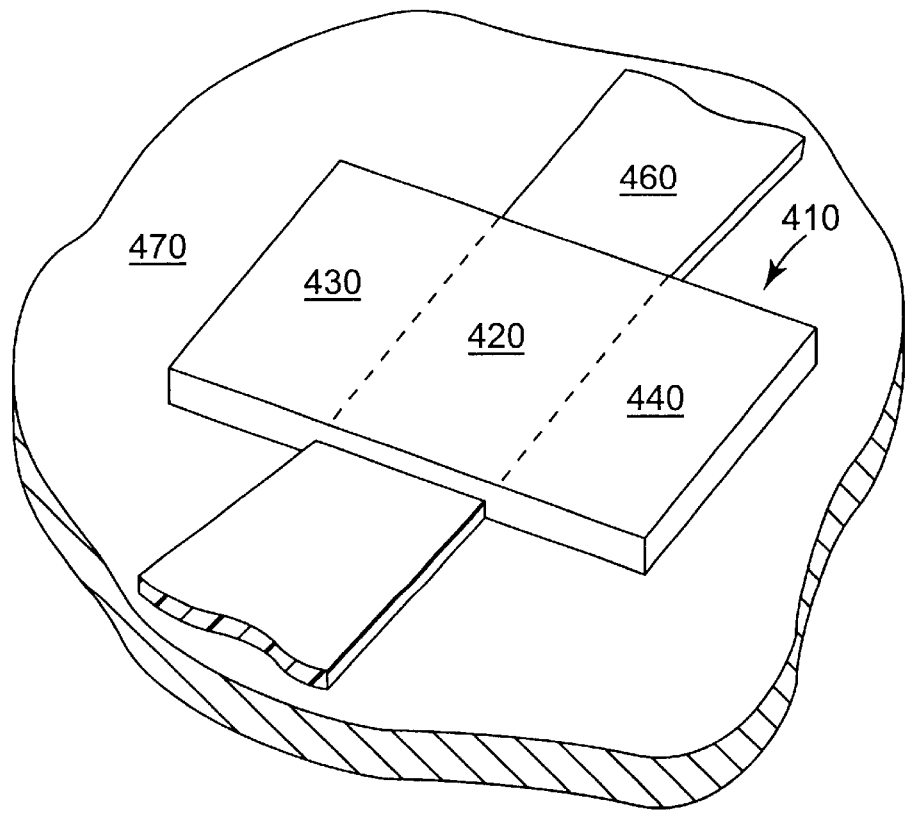
FIG. 10 is a perspective view of a compression element 410 attached to a flexible substrate over an elastic strap.

FIG. 10 illustrates a retention assembly that is the result of one process according to the present invention in which the element 410 is welded or otherwise bonded in place on a flexible substrate 470 such that article 460 is retained between the element 410 and the substrate 470. It is theorized that the compression elements and methods of the invention operate by compressing the article 460 while stretching the portion of the flexible substrate 470 beneath the element 410 such that it is held taut during bonding. Because the article 460 is compressed during welding, the combination of the taut substrate 470 and a slightly compressed article 460, and element 410 work together to retain the article 460 between the element 410 and substrate 470. It should be noted, however, that the present invention should not be limited by this theory, which is offered only to potentially improve understanding of the invention.

Although not required, it may be advantageous that the article 460 include at least some elastic material that deforms in response to compression during bonding of the compression element 410. In some instances, it may be preferred that the article 460 consist essentially of an elastic material. Some suitable articles that include elastic materials include, but are not limited to braided cotton-elastic bands, rubber bands (for example, natural rubber or polyisoprene), and thermoplastic elastomeric materials.

Figure 11:
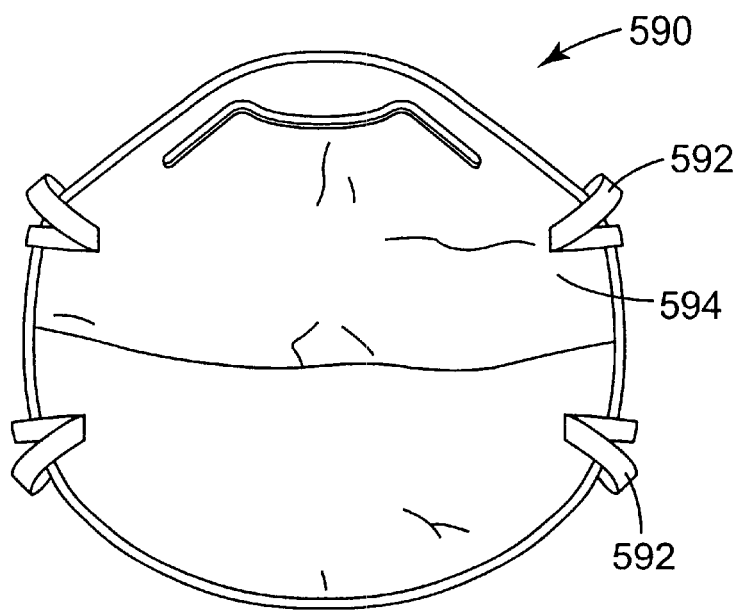
FIG. 11 illustrates a respirator 590 in which the headbands 592 are attached directly to the respirator body 594.

FIG. 11 illustrates a respirator 590 that has elastic straps 592 attached directly to the body 594 of the respirator 590. The compression elements of the present invention can be used to accomplish this method of attachment without puncturing the mask body 594.

Figure 12:
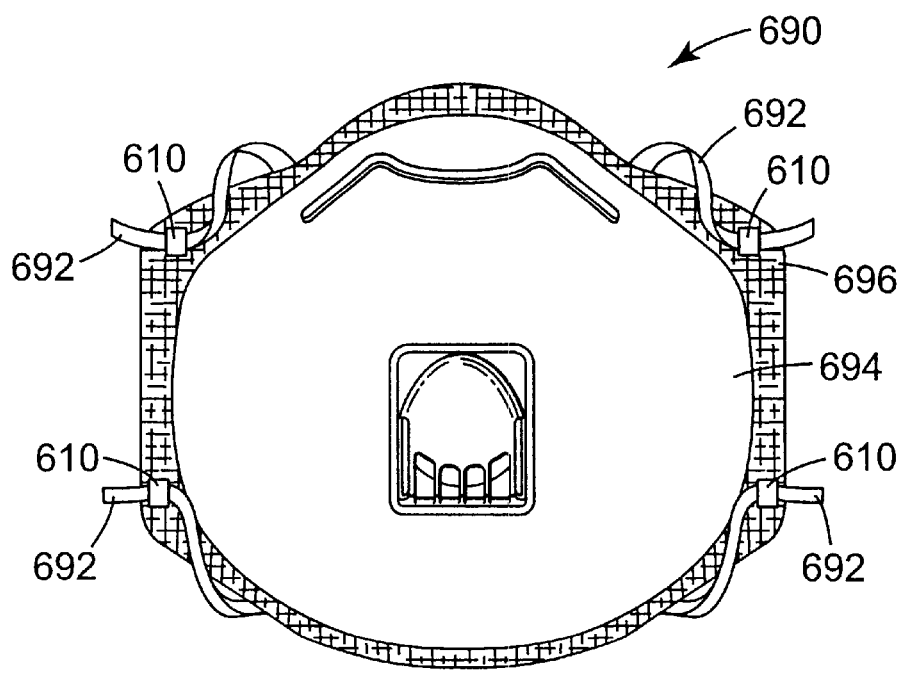
FIG. 12 illustrates a respirator 690 in which the headbands 692 are attached to the dog ear portion 696 surrounding the respirator body 694.

Another use of the compression elements 610 of the present invention is illustrated in FIG. 12. The respirator 690 includes straps 692 that are attached to the dog ear portion 696 of respirator 690 by welded elements 610. As discussed above, however, the use of the welded elements in connection with respirators is only one illustrative application of the present invention and it may find use in a variety of applications in which an elastic article is desired to be secured to a flexible substrate.

The respirator body typically includes nonwoven polymeric filter media that makes up a substantial portion of the respirator body. In other respirators, a substantial portion of the body may be constructed of a material that is substantially impermeable to air (see, for example, U.S. Pat. No. 5,062,421 to Burns et al. which describes an elastomeric rubber face piece). Respirators having the cup-shaped configuration shown in FIGS. 11 and 12 are described in, for example, U.S. Pat. No. 5,307,796 to Kronzer et al., U.S. Pat. No. 4,807,619 to Dyrud et al. and U.S. Pat. No. 4,536,440 to Berg. Respirators of the invention may take on other configurations, such as flat masks, alternative cup-shaped masks, and masks that include filtration assemblies. See, for example, U.S. Pat. No. Re. 28,102 (Mayhew); U.S. Pat. No. 3,971,373 (Braun); U.S. Pat. No. 4,215,682 (Kubik et al.); U.S. Pat. No. 4,419,993 (Peterson); U.S. Pat. Nos. 4,542,420 (Krueger et al.); U.S. Pat. No. 4,729,371 (Krueger et al.); U.S. Pat. No. 4,795,668 (Krueger et al.); U.S. Pat. No. 4,827,924 (Japtunich); and U.S. Pat. No. 5,908,598 (Rousseau et al.).

The preceding specific embodiments are illustrative of the practice of the invention. This invention may be suitably practiced in the absence of any element or item not specifically described in this document. The complete disclosures of all patents, patent applications, and publications are incorporated into this document by reference as if individually incorporated.

Various modifications and alterations of this invention will become apparent to those skilled in the art without departing from the scope of this invention, and it should be understood that this invention is not to be unduly limited to illustrative embodiments set forth herein.

What is claimed is:

1. A compression element that comprises:

a body that comprises a front face and a back face;

a clamping area on the front face of the body;

first and second bonding areas located on opposite sides of the clamping area on the front face of the compression element, wherein each of the first and second bonding areas comprises at least one energy director; and first and second channels in the front face of the element body, the first channel located between the first bonding area and the clamping area and the second channel located between the second bonding area and the clamping area.

2. The compression element of claim 1, wherein the energy directors in the first and second bonding areas are elongated along the front face of the compression element.

3. The compression element of claim 2, wherein the energy directors are oriented parallel to each other.

4. The compression element of claim 3, wherein the energy directors are aligned along axes that do not intersect the clamping area of the compression element.

5. The compression element of claim 1, wherein each of the first and second bonding areas comprise a plurality of discrete energy directors.

6. The compression element of claim 1, wherein the clamping area on the front face of the compression element is higher than peaks of the energy directors in the first and second bonding areas.

7. The compression element of claim 1, wherein the clamping area on the front face of the compression element is lower than the energy directors in the first and second bonding areas.

8. The compression element of claim 1, wherein the clamping area comprises a textured surface.

9. A compression element that comprises:
- a flat clamping area on a front face of a body, the clamping area comprising opposing first and second sides on the front face;
- at least one ultrasonic energy director protruding from the front face of the body on the first side of the clamping area; and
- at least one ultrasonic energy director protruding from the front face of the body on the second side of the clamping area.

10. The compression element of claim 9, further comprising a first channel located between the at least one ultrasonic energy director and the clamping area on the first side of the clamping area, and a second channel located between the at least one ultrasonic energy director and the clamping area on the second side of the clamping area.

11. The compression element of claim 9, wherein each ultrasonic energy director comprises an elongated ultrasonic energy director that extends along a direction located within a plane defined by the flat clamping area.

12. The compression element of claim 9, wherein each ultrasonic energy director comprises a peak narrower than a base of the ultrasonic energy director.

13. The compression element of claim 9, wherein a plurality of ultrasonic energy directors protrude from the front face of the body on the first side of the clamping area.

14. The compression element of claim 12, wherein each ultrasonic energy director of the plurality of ultrasonic energy directors on the first side of the clamping area comprises an elongated ultrasonic energy director that extends along a direction located within a plane defined by the flat clamping area.

15. The compression element of claim 14, wherein the elongated ultrasonic energy directors are oriented parallel to each other.

16. The compression element of claim 14, wherein the elongated ultrasonic energy directors are aligned along axes that do not intersect the clamping area of the compression element.

17. The compression element of claim 12, wherein a plurality of ultrasonic energy directors protrude from the front face of the body on the second side of the clamping area, wherein each ultrasonic energy director on the second side of the clamping area comprises an elongated ultrasonic energy director that extends along a direction located within a plane defined by the flat clamping area.

18. The compression element of claim 9, wherein the clamping area on the front face of the compression element is higher than the ultrasonic energy directors.

19. The compression element of claim 9, wherein the clamping area on the front face of the compression element is lower than the ultrasonic energy directors.

20. The compression element of claim 9, wherein the clamping area comprises a textured surface.

* * * * *

UNITED STATES PATENT AND TRADEMARK OFFICE
CERTIFICATE OF CORRECTION

PATENT NO.    : 6,705,317 B2
DATED         : March 16, 2004
INVENTOR(S)   : Castiglione, David M.

It is certified that error appears in the above-identified patent and that said Letters Patent is hereby corrected as shown below:

<u>Column 10,</u>
Line 9, delete "12" and insert therefore -- 13 --.

Signed and Sealed this

First Day of June, 2004

JON W. DUDAS
*Acting Director of the United States Patent and Trademark Office*